United States Patent [19]

Toraason

[11] Patent Number: 5,232,012
[45] Date of Patent: Aug. 3, 1993

[54] FLUID FLOW CONTROL DEVICE

[75] Inventor: Clifford M. Toraason, Cincinnati, Ohio

[73] Assignee: General Electric Company, Cincinnati, Ohio

[21] Appl. No.: 865,547

[22] Filed: Apr. 9, 1992

[51] Int. Cl.⁵ ............................................. F16K 15/14
[52] U.S. Cl. .................................. 137/498; 137/517; 137/859
[58] Field of Search ................. 137/498, 517, 859

[56] References Cited

U.S. PATENT DOCUMENTS

| | | | |
|---|---|---|---|
| 2,219,408 | 10/1940 | Benz | 137/498 |
| 2,615,675 | 10/1952 | Mellert | 137/498 |
| 2,646,063 | 7/1953 | Hayes | 137/218 |
| 2,767,734 | 10/1956 | Anderson | 137/498 |
| 3,367,363 | 1/1968 | Hoffman | 137/517 |
| 3,659,625 | 5/1972 | Coiner et al. | 137/204 |

Primary Examiner—Robert G. Nilson
Attorney, Agent, or Firm—Jerome C. Squillaro; John R. Rafter

[57] ABSTRACT

A spaced apart apertured dual diaphragm fluid flow control device utilizes one flexible overcenter diaphragm to sense a variance flow condition and flex over center into engagement with the other diaphragm where cooperative apertures in the diaphragms cut off or regulate fluid flow through the device. Electrical circuit means are provided for an operational signal.

14 Claims, 1 Drawing Sheet

FLUID FLOW CONTROL DEVICE

BACKGROUND OF THE INVENTION

This invention relates to a fluid flow control device, and more particularly to a dual diaphragm excess fluid flow control device which automatically senses abnormal hydraulic or pneumatic fluid flow and provides a compensating response and, if desirable, an indicating signal of fluid flow conditions through the device.

Fluid control devices which, for example, react to excess fluid flow therethrough to change or terminate the flow usually include a number of moving or sliding parts which are exposed to contaminants and deleterious deposits from the fluid and corrosion of sliding surfaces, factors which lead to binding and sticking of parts with resultant erratic performance of the device. Other such devices require a complex arrangement of parts to provide an electrical signal indicative of flow conditions requiring some control or modification.

OBJECTS OF THE INVENTION

It is an object of this invention to provide a dual diaphragm flow control device for hydraulic and pneumatic systems.

It is another object of this invention to provide an improved diaphragm operated flow control device.

It is a further object of this invention to provide a predeterminedly apertured diaphragm as the operative diaphragm of a dual diaphragm flow control device.

It is another object of this invention to provide an improved dual diaphragm flow control device with electrical circuit connection diaphragm components.

These and other objects and advantages of this invention will be better understood when taken in connection with the following description and drawings.

DESCRIPTION OF PREFERRED EMBODIMENTS

Figure 1:
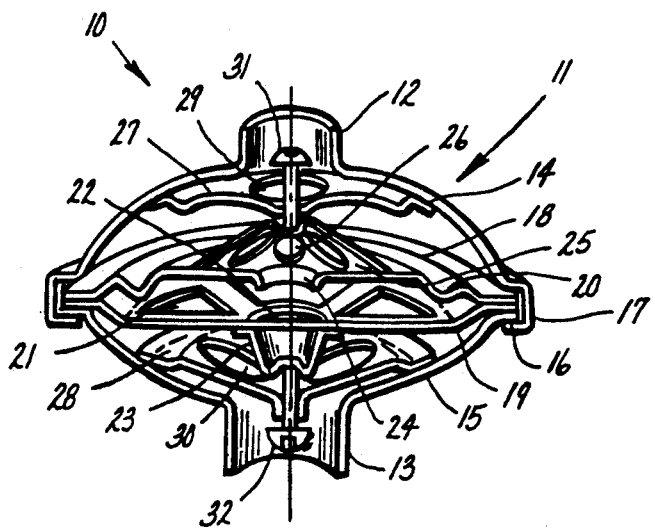
FIG. 1 is a schematic cross-sectional view of one preferred dual diaphragm flow control device of this invention.

Referring now to FIG. 1, dual diaphragm flow control device 10 is operative to terminate fluid flow under excess flow conditions. Device 10 comprises a hollow body 11 with concentric entrance and exit conduits 12 and 13, respectively. In one form of this invention, hollow body 11 may comprise, in cross-section, an ellipsoid defined by an upper cup-shaped half section 14 and a lower cup-shaped half section 15. One of the half sections, section 15, for example, includes an out-turned peripheral rim or lip 16 while the opposite half section, section 14, includes a peripheral in-turned channel section 17 which engages lip 16 and is utilized to clamp the two half sections 14 and 15 in the assembled hollow body relationship of FIG. 1. Fluid flows through hollow body 11 from concentric inlet 12 through body 11 to exit from concentric exit 13. Positioned transversely in hollow body 11 across the flow path between inlet and exit conduits 12 and 13 is a dual diaphragm arrangement comprising a pair of generally parallel spaced apart inlet and exit diaphragms 18 and 19. Inlet diaphragm 18 comprises a circular disc-like member having its rim periphery engaged and retained by channel section 17 of upper half body section 14. Diaphragm 18 is formed to be reciprocally flexible in the axial or coincident direction of inlet 12 and exit 13. In this connection, diaphragm 18 includes biasing and overcenter means in the form of, for example, a concentric circular fold or convolute 20 adjacent its periphery at section 17. As is known in the art, fold 20 acts as an overcenter means which exerts a biasing or spring action on axial motion of diaphragm 18. As illustrated in FIG. 1, as diaphragm 18 is deflected towards exit 13, fold 20 is being compressed or radially diminished so that the central part of diaphragm 18 may continue to move towards exit 13. As this motion continues, diaphragm 18 reaches a mid point position where fold 20 is radially compressed to its maximum (minimum radial dimension) and exerts a purely radially inwardly directed biasing force on diaphragm 18. However, as diaphragm 18 moves past the mid point position, fold 20 tends to expand to its original state and an axial component of this biasing force moves diaphragm 18 rapidly past its mid point position and into engagement with diaphragm 19. It is this rapid diaphragm movement or over center snap action which is applied to a particular dual diaphragm flow control device of this invention. Inlet diaphragm 18 is the action diaphragm of the dual diaphragm arrangement and acts in combination and concert with a further spaced exit diaphragm 19. Exit diaphragm 19 is a circular shallow dished diaphragm having its peripheral and circular rim in planar engagement with the rim periphery 16 of diaphragm 18 within the in-turned channel section 17 of upper half body section 14. The dish section of diaphragm 19 includes fluid flow through means in the form of a plurality of generally triangularly shaped cutouts or exit apertures 21 arranged to surround and cooperate with fluid flow cutoff means comprising a central opening 22 in exit diaphragm 19 combined with a closed cup or chamber structure 23. Cup structure 23, as illustrated, has its rim opening coincident with and sealed to aperture 22. In this position, cup 23 receives fluid flow from an open flared fluid flow nozzle 24 which projects from inlet diaphragm 18 in an axial direction coaxially towards opening 22. As illustrated in FIG. 1 diaphragm 18 also includes a concentric dome section 25 over or surrounding nozzle 24. Dome section 25 includes a concentric circular row of open flow apertures 26 of a combined flow area to pass a predetermined fluid flow through dome section 25, nozzle 24, apertures 21 of diaphragm 19 and then through exit 13. All fluid flow through device 10 passes through dome section 25 and nozzle 24.

However, under excess fluid flow conditions a significant pressure drop is generated across nozzle 24 so that fluid pressure on diaphragm 18 exerts a force against diaphragm 18 tending to move diaphragm 18 in a direction towards diaphragm 19. Fold 20 of diaphragm 18 has a predetermined biasing force correlated to the flow of fluid through device 10. At a predetermined fluid flow rate and/or pressure, diaphragm 18 is caused to flex towards diaphragm 19, and, if the pressure or flow rate is in excess of a predetermined amount, diaphragm 18 will flex beyond its overcenter position and, as heretofore described will snap over into engagement with diaphragm 19. When this snap over occurs, flare nozzle 24 will project into and seal against opening 22 of closed cup structure 23 and effectively close off further flow through device 10. The periphery of opening 22 of diaphragm 19 may be produced from a satisfactory resilient fluid sealing material so that flare nozzle 24 may peripherally and sealingly engage the periphery of closed cup opening 22 and cut off further fluid flow through nozzle 24 and device 10.

As described, device 10 serves to operate effectively to provide fluid flow cutoff at a predetermined flow rate condition. A pair of inlet and exit plates 27 and 28 are also included in hollow body 11. Inlet plate 27 is a dished or convex plate having a number of open fluid flow apertures therethrough including a central aperture 29 concentric with inlet means 12. Exit plate 28 is positioned adjacent exit means 13 with its curvature protruding towards exit means 13.

Device 10 also includes adjustment means to adjust the response of diaphragm 18. For example, an adjusting screw 31 passes through and is threadedly engaged by inlet plate 27 and is exposed through aperture 29 of plate 27. Screw 31 bears against dome section 25 of diaphragm 18 to change the spring constant or biasing action of convolute 20 so that less or more fluid pressure operates diaphragm 18. A further adjusting screw 32 passes axially through and is threadedly engaged by outlet plate 28 to bear against cup structure 23. Screw 32 serves to axially position diaphragm 19 with respect to diaphragm 18 so that a longer or shorter travel of diaphragm 18 operates device 10. The fluid flow cutoff flexing of diaphragm 18 positive and fixed. The overcenter action of diaphragm 18 retains diaphragm 18 in the closed nozzle position and if fluid flow rate or pressure drops below that which effectuated the cutoff, diaphragm 18 does not automatically reset.

Adjustment of screw 32 may be employed to move diaphragm 19 towards diaphragm 18 by such an amount that diaphragm 18 will cut off fluid flow before it reaches its overcenter position. Upon a reduction in fluid flow pressure in device 10, diaphragm 18 will automatically return to its original unflexed position.

As described, the FIG. 1 device is operable to cut off fluid flow under predetermined conditions. There are other conditions under which opposite fluid flow control is desired, e.g. to change from a cease flow condition to a flow condition. Device 10 is easily utilized to change from a cease flow to open flow condition. For example, in device 10, when diaphragm 18 is in its flexed and flow cutoff condition, if device 10 is oppositely connected so that fluid is caused to flow into exit means 13, it will easily pass through exit plate 28, diaphragm 19 apertures 21, and cause a sufficient pressure drop across apertures 26 in diaphragm 18 to flex diaphragm 18 away from diaphragm 19 and withdraw nozzle 24 from its sealed condition in cup structure 23 to commence fluid flow through nozzle 24. In this embodiment device 10 serves to change fluid flow conditions from a cease flow to a current flow depending on the size of nozzle 24 and apertures 26 in dome section 25. In other circumstances it may be desirable to change from a lesser fluid flow to a larger fluid flow. A modification of the device 10 for this purpose is illustrated in FIG. 2.

Figure 2:
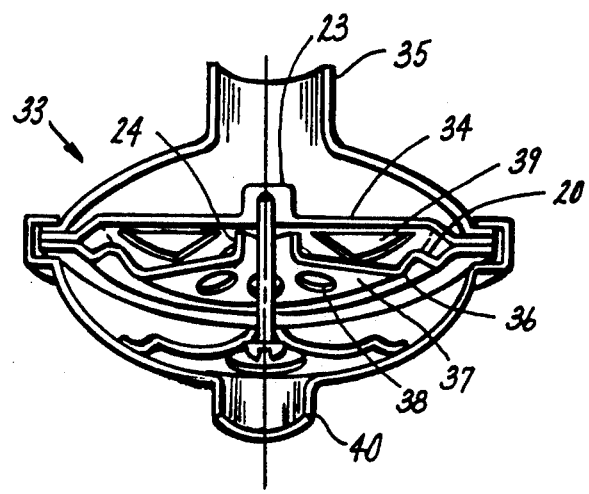
FIG. 2 is a partial and schematic cross-sectional view of a fluid flow device for increasing or decreasing fluid flow.

In FIG. 2, device 33 includes a diaphragm 34 similar to diaphragm 19 of FIG. 2 but oppositely positioned, i.e. adjacent inlet 35 with its cup structure 23 having its closed end exposed to fluid flow from inlet 35. A modified form 36 of diaphragm 18 of FIG. 1 is positioned next adjacent diaphragm 34 in an unflexed condition with its nozzle 24 either in a closed off or near closed off position in cup structgure 23. Dome structure 25 of diaphragm 18 of FIG. 1 is replaced with a smooth uninterrupted planar section 37 having control apertures 38 therein. Apertures 38, as distinct from apertures 26 of FIG. 1, pass fluid flow directly through device 33. Fluid flow through inlet 35 passes directly through apertures 39 of diaphragm 34 and apertures 38 of diaphragm 36 to exit from exit 40. Apertures 38 are of a size to pass a predetermined fluid flow through device 33. However, when the pressure drop across apertures 38 reach a predetermined value, diaphragm 36 is caused to flex away from diaphragm 34 withdrawing nozzle 24 from a sealed or partially sealed condition with cup structure 23 to open nozzle 24 to a fluid flow which is in addition to fluid flow through apertures 38. Accordingly, device 33 serves to change a fluid flow from a lesser flow to a greater fluid flow. In this embodiment apertures 38 remain open to pass fluid through device 23 independently of the position of nozzle 24.

Apertures 38 may also be employed in the FIG. 1 embodiment to provide a continuing predetermined flow through device 10 after inlet diaphragm 18 has flexed into its overcenter position and has closed off nozzle 24 in opening 22. For example, diaphragm 18 of FIG. 1 may contain additional apertures therethrough outside of the periphery of dome section 25 or interiorly thereof between, for example, nozzle 24 and the base of dome section 25. In this described embodiment the additional apertures will continue to support flow through device 10 regardless of the position of diaphragm 18. The described embodiment is somewhat similar to the use of the FIG. 2 diaphragm 37 in place of diaphragm 18 of FIG. 1 which, in effect, would enable device 10 of FIG. 1 to pass a predetermined flow, and upon flexing of diaphragm 18 to close off nozzle 24, flow would continue, but at a reduced rate depending on the number and size of the added apertures.

The flow control device of this invention may also be expeditiously modified for connection to an electrical circuit to provide an electrical signal indicative of its operative position. For example, appropriate electrical connection may be provided for a metal diaphragm 18 of FIG. 1 as illustrated in FIGS. 3 and 3a.

Figure 3:
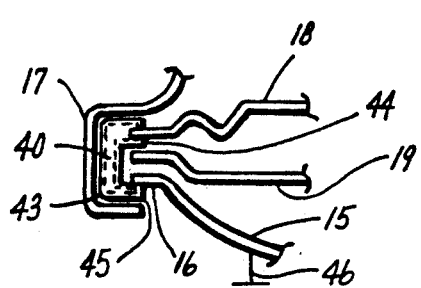
FIG. 3 is a partial and schematic cross-section of electrical circuit components incorporated in a flow control device of this invention.
Figure 3A:
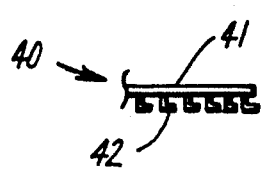
FIG. 3a is a cross-sectional view of a composite electrical conduction strip utilized in FIG. 3.

Referring to FIG. 3, channel 17, which is also channel 17 of FIG. 1, includes conforming strips of a composite material 40 nested therein. As illustrated in FIG. 3a, composite material 40 comprises a strip of insulating material 41 with one surface layer 42 of an electrically conducting metallic material such as a metal foil or metallized coating. In FIG. 3, one channel shaped strip 43 of material 40 lines channel 17 with its conductive surface in contact with one side of the rim periphery of, for example, a metal diaphragm 18 of FIG. 1 and electrically insulates metal diaphragm 18 from contact with metal channel 17 and metal housing 11. A second channel-shaped strip 44 of material 40 makes electrical contact with the opposite side of the rim periphery of diaphragm 18 to electrically insulate diaphragm 18 from contact with diaphragm 19 and passes between housing lip 16 and channel 17 where, because of its opposite fold or curvature, the two conducting surfaces, of strips 43 and 44 are in contact with each other at 45 to form an external electrical insert connection for electrical circuitry and instrumentation purposes.

Further electrical factors are established as follows. Referring again to FIG. 1, aperture 22 of diaphragm 19 includes a periphery which is electrically conductive, for example, by including an electrically conductive filler within the perimeter material of aperture 22. Also, screw 31 of FIG. 1 is a non-conductive screw or otherwise insulated from electrical contact with metal plate 27 and metal body section 14. To complete the electrical factors, body 11 is provided with a suitable electrical ground connection at 46 (FIG. 3). With these electrical factors present, and referring again to FIG. 1, when diaphragm 18 snaps overcenter as previously described, its nozzle 24 (FIG. 1) makes electrical contact with diaphragm 19, which, as shown in FIG. 3, is in peripheral electrical contact with lower body half section 15. Accordingly, with electrical connection 45 and electrical ground connection 46, an appropriate electrical circuit may be connected to device 10 to provide an electrical signal when diaphragm 18 snaps overcenter. Appropriate and related electrical means may be similarly applied to the FIG. 2 modification.

This invention may find wide application as a fluid loss prevention device in fluid delivery systems, as a variable damping device for hydraulic dampers, a resetting or non-resetting pressure relief valve, etc. and a hydraulic damper control etc.

While this invention has been disclosed and described with respect to preferred embodiments, it will be understood by those skilled in the art that various changes and modifications may be made without departing from the spirit and scope of the invention in the following claims.

What is claimed is:

1. A dual diaphragm fluid flow control device comprising in combination
    (a) a hollow body having spaced apart fluid flow inlet and exit means therein for fluid flow through said device
    (b) an inlet diaphragm positioned transversely adjacent said inlet means,
    (c) an exit diaphragm positioned transversely adjacent and spaced from said exit means,
    (d) said inlet diaphragm having a fluid flow nozzle axially projecting therefrom and surrounded by a plurality of open nozzle apertures, said nozzle and said nozzle apertures adapted to pass a flow of fluid from said inlet means to said exit diaphragm,
    (e) said exit diaphragm having a central nozzle opening therethrough oppositely disposed from said projecting nozzle of said inlet diaphragm and adapted to receive said projecting nozzle therein in fluid sealing peripheral relationship,
    (f) a cup structure attached to said exit diaphragm in concentric and rim sealed relationship with said central opening so that said projecting nozzle can project through said central opening into said cup,
    (g) said exit diaphragm having a plurality of open fluid flow apertures therethrough surrounding said cup so that fluid may flow from said inlet means through said nozzle apertures and through said projecting nozzle to pass through said open apertures in said exit diaphragm to said exit means.

2. The invention as recited in claim 1 wherein said inlet diaphragm includes a central dome protuberance protruding in the direction of said inlet means and surrounding said nozzle with said nozzle apertures positioned in said dome structure.

3. The invention as recited in claim 1 wherein an apertured inlet flow plate is positioned in said body transversely across said inlet means and an apertured exit flow plate is positioned in said body adjacent and transversely across said exit means.

4. The invention as recited in claim 1 wherein an adjustment screw is threaddedly engaged through an inlet flow plate to bear against a central dome protruberance to change the biasing action of a concentric overcenter convolute fold in said inlet diaphragm.

5. The invention as recited in claim 1 wherein said inlet diaphragm comprises a smooth uninterrupted planar surface surrounding said nozzle, and a circular and concentric row of nozzle apertures therein.

6. The invention as recited in claim 1 wherein said exit diaphragm is positioned transversely adjacent said inlet means with said cup structure exposed to said inlet means and said inlet diaphragm in its flexed position in contact with said exit diaphragm in fluid flow cutoff position.

7. The invention as recited in claim 1 wherein electrical insulation and contact means are included to provide an electrical signal indicating operation of said fluid flow control device, said electrical insulation and contact means comprising
    (a) an electrically conductive inlet diaphragm,
    (b) electrical insulating means electrically insulating said inlet diaphragm from said body,
    (c) an electrically conductive exit diaphragm in electrical contact with said body,
    (d) electrical insulating means electrically insulating said exit diaphragm from said inlet diaphragm,
    (e) an external electrical connector for said body to establish an electrical connection to said inlet diaphragm and
    (f) electrical ground connection on said body whereby said inlet diaphragm and said exit diaphragm may be integrated into an electrical circuit to provide an electrical signal indicative of overcenter flexing of said inlet diaphragm.

8. A dual diaphragm fluid control device comprising in combination
    (a) a hollow body member having opposite concentric and spaced apart fluid inlet and exit means,
    (b) a pair of inlet and exit diaphragms positioned concentrically in said body and transversely between said inlet and exit means,
    (c) said inlet diaphragm including fluid flow passage means therein to provide a flow of fluid through said inlet diaphragm,
    (d) said exit diaphragm having combined fluid flow passage and fluid flow cutoff means therein so that fluid enters said inlet means to flow through said inlet diaphragm and said exit diaphragm to exit said body through said exit means, and
    (e) biasing means in said inlet diaphragm responsive to fluid flow from said inlet means to permit said inlet diaphragm to move into engagement with said exit diaphragm so that said fluid flow passage means engages said combined fluid flow passage and fluid flow cutoff means to cut off fluid flow through said device, said biasing means including overcenter means having a concentric overcenter convolute fold in said inlet diaphragm.

9. The invention as recited in claim 8 wherein said fluid flow passage means in said inlet diaphragm comprises a projecting fluid flow nozzle.

10. The invention as recited in claim 8 wherein said combined fluid flow passage and fluid flow cutoff means in said exit diaphragm comprises a plurality of exit apertures therethrough with a closed chamber structure defining one of said apertures.

11. The invention as recited in claim 8 wherein said fluid flow passage means includes a concentric projecting open flared flow nozzle in said inlet diaphragm adapted to fit into a closed chamber aperture in said exit diaphragm.

12. A dual diaphragm fluid control device comprising in combination,
   (a) a hollow body member having opposite concentric and spaced apart fluid inlet and exit means,
   (b) a pair of inlet and exit diaphragms positioned concentrically in said body and transversely between said inlet and exit means,
   (c) said inlet diaphragm including fluid flow passage means therein to provide a flow of fluid through said inlet diaphragm,
   (d) said fluid flow passage means comprising a concentric open flow nozzle projecting from said inlet diaphragm with said inlet diaphragm having a concentric circular row of nozzle apertures therethrough surrounding said concentric open flow nozzle,
   (e) said exit diaphragm having combined fluid flow passage and fluid flow cutoff means therein so that fluid enters said inlet means to flow through said inlet diaphragm and said exit diaphragm to exit said body through said exit means, and
   (f) biasing means in said inlet diaphragm responsive to fluid flow from said inlet means to permit said inlet diaphragm to move into engagement with said exit diaphragm so that said fluid flow passage means engages said combined fluid flow passage and fluid flow cutoff means to cut off fluid flow through said device.

13. The invention as recited in claim 12 wherein said inlet diaphragm comprises a smooth uninterrupted and planar section encircled by a concentric overcenter convolute fold and a concentric circular row of apertures in said section and adjacent said concentric overcenter convolute fold.

14. A dual diaphragm fluid flow control device comprising in combination,
   (a) a hollow body having spaced apart fluid flow inlet and exit means therein for fluid flow through said device,
   (b) an inlet diaphragm positioned transversely adjacent said inlet means,
   (c) an exit diaphragm positioned transversely adjacent and spaced from said exit means,
   (d) said exit diaphragm having a fluid flow nozzle axially projecting therefrom and surrounded by a plurality of open nozzle apertures, said projecting nozzle and said nozzle apertures adapted to pass a flow of fluid from said inlet diaphragm to said exit means,
   (e) said inlet diaphragm having a central nozzle opening therethrough oppositely disposed from said projecting nozzle of said exit diaphragm and adapted to receive said projecting nozzle therein in fluid sealing peripheral relationship,
   (f) a cup structure attached to said inlet diaphragm in concentric and rim sealed relationship with said central nozzle opening so that said projecting nozzle can project through said central nozzle opening into said cup structure,
   (g) said cup structure projecting toward said inlet means,
   (h) said inlet diaphragm having a plurality of open fluid apertures therethrough surrounding said cup structure so that fluid can flow from said inlet means through said open fluid apertures to said exit diaphragm, and
   (i) said exit diaphragm positioned adjacent said inlet diaphragm in its flexed overcenter position with said projecting nozzle in sealing engagement with said cup structure so that fluid flow from said inlet means passes through said inlet diaphragm to bear against and flex said exit diaphragm away from its overcenter position to withdraw said projecting nozzle away from said cup structure and permit fluid flow through said projecting nozzle.

* * * * *